United States Patent
Brown

(10) Patent No.: US 10,894,877 B2
(45) Date of Patent: *Jan. 19, 2021

(54) HIGH MOLECULAR WEIGHT POLYETHYLENE COMPOSITION, PRODUCT AND PROCESS OF MAKING SAME

(71) Applicant: DESGAGNÉ, BROWN ET ASSOCIÉS INC., Laval (CA)

(72) Inventor: John P. Brown, Laval (CA)

(73) Assignee: DESGAGNÉ, BROWN ET ASSOCIÉS INC., Laval (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,330

(22) Filed: Jan. 9, 2020

(65) Prior Publication Data

US 2020/0148867 A1 May 14, 2020

Related U.S. Application Data

(63) Continuation of application No. 16/027,460, filed on Jul. 5, 2018, now Pat. No. 10,570,276.

(51) Int. Cl.
| | | |
|---|---|---|
| *C08L 23/06* | (2006.01) | |
| *C08J 3/20* | (2006.01) | |
| *B29K 105/00* | (2006.01) | |
| *B29B 9/06* | (2006.01) | |
| *B29K 23/00* | (2006.01) | |

(52) U.S. Cl.
CPC .............. *C08L 23/06* (2013.01); *C08J 3/203* (2013.01); *B29B 9/06* (2013.01); *B29K 2023/0675* (2013.01); *B29K 2105/0094* (2013.01); *C08L 2201/08* (2013.01); *C08L 2205/025* (2013.01); *C08L 2205/035* (2013.01); *C08L 2207/20* (2013.01)

(58) Field of Classification Search
CPC ................ C08L 23/06; C08L 2201/08; C08L 2205/025; C08L 2205/035; C08L 2207/20; C08J 3/203; B29B 9/06; B29K 2023/0675; B29K 210/0094
See application file for complete search history.

(56) References Cited

U.S. PATENT DOCUMENTS

| | | | |
|---|---|---|---|
| 8,920,891 B2 | 12/2014 | Michie, Jr. et al. | |
| 9,175,111 B2 | 11/2015 | Kapur et al. | |
| 9,334,396 B2 | 5/2016 | Dewachter et al. | |
| 9,492,963 B2 | 11/2016 | Michie, Jr. et al. | |
| 10,570,276 B2 * | 2/2020 | Brown | B29B 7/005 |
| 2017/0089503 A1 * | 3/2017 | Gauthier et al. | C08K 5/1345 |

* cited by examiner

*Primary Examiner* — Nathan M Nutter
(74) *Attorney, Agent, or Firm* — Norton Rose Fulbright Canada LLP

(57) ABSTRACT

This disclosure relates to a novel type of high molecular weight polyethylene composition, and product made from said composition, with industrially useful properties, and the process of making said composition and product.

16 Claims, No Drawings

HIGH MOLECULAR WEIGHT POLYETHYLENE COMPOSITION, PRODUCT AND PROCESS OF MAKING SAME

CROSS-REFERENCE TO RELATED APPLICATION

The present application is a continuation of U.S. patent application Ser. No. 16/027,460, filed Jul. 5, 2018, now allowed, the entire contents of which are incorporated herein by reference.

FIELD OF INVENTION

This disclosure relates to a novel type of high molecular weight polyethylene composition, and product made from said composition, with industrially useful properties, and the process of making said composition and product.

BACKGROUND OF THE INVENTION

Post consumer recycled (PCR) resin is the recycled product of waste created by consumers whereas virgin resins are produced from fossil fuels.

When PCR resins are reused and transformed into new products, less fossil fuels are required, which has environmental implications such as reducing greenhouse/carbon gas emissions. There will also be a continuing economic incentive to use PCR versus virgin resins as the overall cost of petroleum-based raw materials continually increases.

Various methods utilized in the past to integrate post-consumer resins into extrusion process resulted in varying degrees of success. The recycled resins have generally degraded mechanical properties as the result of numerous heat cycles, branching created by infiltration of foreign polymers and ultimately scission of the long polyethylene chains. These degraded mechanical properties result in sheet defects during the extrusion process and thus render the utilization of recycled resin as having a negative impact on extrusion costs.

There is therefore still a need to identify applications to integrate post-consumer resins and especially so in order to provide products having advantageous properties susceptible to provide an industrial application.

SUMMARY OF THE DISCLOSURE

An aspect relates to a composition comprising:
i) a first virgin polyethylene resin, having a bimodal molecular weight distribution which is high molecular weight (HMW), having a high load melt index measured according ASTM D-1238 (HLMI) of from about 1 to 6 g/10 min; and comprising a particle size distribution of less than about 50 µm;
ii) a second virgin polyethylene resin, an HLMI from about 20-70 g/10 min, a melt flow index measured according ASTM D-1238 (MFI) of from about 0.20-0.60 g/10 min, and comprising a particle size distribution of less than about 50 µm;
iii) a first post-consumer polyethylene resin, having a MFI of from about 0.10-0.70 g/10 min;
iv) a second post-consumer polyethylene resin, which is HMW, and having a HLMI of from about 4-8 g/10 min; and
v) a polyethylene antioxidant.

A further aspect relates to a polyethylene product comprising the composition as defined herein.

Still a further aspect relates to process for preparing an polyethylene product, said process comprising the steps of:
(a) providing:
a first virgin polyethylene resin, having a bimodal molecular weight distribution which is high molecular weight (HMW), having a high load melt index measured according ASTM D-1238 (HLMI) of from about 1 to 6 g/10 min; and comprising a particle size distribution of less than about 50 µm;
a second virgin polyethylene resin, an HLMI of from about 20-70 g/10 min, a melt flow index measured according ASTM D-1238 (MFI) of from about 0.20-0.60 g/10 min, and comprising a particle size distribution of less than about 50 µm;
a first post-consumer polyethylene resin, having a MFI of from about 0.10-0.70 g/10 min;
a second post-consumer polyethylene resin, which is HMW, and having a HLMI of from about 4-8 g/10 min; and
a polyethylene antioxidant;
(b) blending i) to v) from step (a); and
(c) melting and shaping the blend from step (b) to obtain said polyethylene product.

DETAILED DESCRIPTION OF THE DISCLOSURE

In one embodiment, the composition/product described herein has at least one property selected from a Density of about 0.94-0.96 gr/cm$^3$ assessed according to ASTM D792, a Melt Flow Index (MFI) of about 0.05-0.15 gr/10 min at 190° C. with a weight load of 2.16Kg assessed according to ASTM D1238, a High Load Melt Index (HLMI) of about 9-11 gr/10 min at 190° C. with a weight load of 21.6 Kg assessed according to ASTM D1238, an notched Izod impact factor of >8 (ft-lb/in) (NO-BREAK) assessed according to ASTM D256, a Flexural Modulus at 2% strain assessed of about 950-1200 Mpa according to ASTM D790 and Tensile Yield of greater than about 25 Mpa assessed according to ASTM D638.

In one embodiment, said at least one property is a Density of about 0.949-0.955 gr/cm$^3$, a MFI of about 0.06-0.11 gr/10 min at 190° C. with a weight load of 2.16 Kg, HLMI of about 9-11 gr/10 min at 190° C. with a weight load of 21.6 Kg, an notched Izod impact factor of >8 (ft-lb/in) (NO-BREAK) assessed according to ASTM D256, a Flexural modulus at 2% strain of about 1030-1110 Mpa, or a Tensile Yield of about 25-32.5 Mpa.

As used herein, the expressions "substantially equal" or "about" allows a variation of ±10%, preferably ±5%. The use of "about, appended to a range means that "about" applies to both the lower and higher limits of the range.

It is contemplated that the first and second virgin polyethylene resins are not required to be "Prime Virgin" but may be wide-spec or off-grade. They may, for example, be resulting from inconsistencies in the process flow of the reactor that created this material. Wide-spec resins may also be arising from a transitional processes. For example, when moving from one grade of material to another at the reactor level and in the middle of the transition, "granular" polyethylene is created that meets neither specification.

In one embodiment, the particle size of said first and second virgin polyethylene resin is each independently comprising a particle size distribution of from about 1 to 50 µm.

In one embodiment, the particle size of said first and second virgin polyethylene resin is each independently comprising a particle size distribution of less than about 50 µm.

In one embodiment, said particle size of said first and second virgin polyethylene resin is each independently comprising a particle size distribution of from about 1 to 30 μm.

In one embodiment, the particle size of said first and second virgin polyethylene resin is each independently comprising a particle size distribution of less than about 30 μm.

The first and second virgin polyethylene resin may comprise a proportion of particles having a size greater than 50 microns (called an agglomerates and are usually created by accident in the reactor). The virgin polyethylene resin may also comprise a proportion of particles that are less than 1 micron. The inventor contemplates that the these are acceptable to the extent that the required properties identified for each resin (e.g. HLMI and MFI) are met.

In one embodiment, the first (bimodal) virgin polyethylene resin (HMW) has a molecular range of from about 100000 to 500000.

In one embodiment, the second virgin polyethylene resin has a molecular range of from about 60000 to 100000.

The expression bimodal, with reference to the first virgin polyethylene resin, is well known to the skilled practitioners and refers to a combination of two distinct LMW and HMW distribution curves that form the combined MW distribution curve of this High Molecular Weight material (HMW). This distribution is generally obtained from two polymerization (co-monomer) reactors in series (LMW and HMW).

In one embodiment, the first post-consumer polyethylene resin is a blow molding grade with a molecular weight distribution of 40,000 to 120,000. This broader molecular weight distribution is as a result of linear low density polyethylene and low density polyethylene being present in the post-consumer stream in addition to higher molecular weight high density polyethylene.

In one embodiment, the second post-consumer polyethylene resin is a polyethylene having a molecular weight between 80,000 and 500,000. The broader molecular weight distribution is as a result of high density polyethylene being present in the post-consumer HMW stream.

The first post-consumer polyethylene resin may be considered a "fractional melt" (i.e. melt index (MFI) is less than 1, measured under ASTM D 1238). Post-consumer implies that these bottles or parts have been used for their intended purpose and subsequently washed and cleaned. The resin may be obtained additionally, for example, from post-industrial blow molded bottles Post-Industrial bottles have not been used for their intended purpose and are subsequently clean. Typically, the resin may be provided as a ⅜" regrind.

The second post-consumer polyethylene resin may be obtained, for example, from post-industrial barrels, trays, industrial pipe, and conduit ground. Typically, the resin may be provided as a ⅜" regrind.

In one embodiment, each of said first virgin polyethylene resin, said second virgin polyethylene resin, said first post-consumer polyethylene resin, and said second post-consumer polyethylene resin is a high density polyethylene.

In one embodiment, said first virgin polyethylene resin, has a density of from about 0.948 to 0.955 g/cm$^3$.

In one embodiment, said second virgin polyethylene resin, has a density of from about 0.950 to 0.960 g/cm$^3$.

In one embodiment, said first post-consumer polyethylene resin has a density of from about 0.955 to 0.970 g/cm$^3$.

In one embodiment, said second post-consumer polyethylene resin has a density of from about 0.952 to 0.958 g/cm$^3$.

In one embodiment, a weight ratio of the total virgin polyethylene resin:post-consumer polyethylene resin in the composition/product is from about 0.8-1.2:1.2-0.8, alternatively from about 0.9-1.1:1.1-0.9, or still alternatively about 1:1.

In one embodiment, a weight ratio of the first virgin polyethylene resin to the second virgin polyethylene resin is from about 0.8-1.2:1.2-0.8, alternatively from about 0.9-1.1:1.1-0.9, or still alternatively about 1:1.

In one embodiment, a weight ratio of the first post-consumer polyethylene resin to the second post-consumer polyethylene resin is from about 0.8-1.2:1.2-0.8, alternatively from about 0.9-1.1:1.1-0.9, or still alternatively about 1:1.

In practice, when calculated for the total polyethylene components, the weight % ranges are about 25% each, alternatively about 22.5-27.5% or alternatively about 20-30%, wherein the total % must be 100%.

In one embodiment, the composition/product disclosed herein may include additives.

In one embodiment, the additives may include dyes, heat stabilizers, UV absorbers, plasticizers, opacifiers, nucleating agents, clarifiers, diluents, and/or fillers.

In one embodiment, the additive is carbon black.

In one embodiment, the w/w % amount of carbon black relative to the total weight of the composition (i.e. including all polyethylene resins and additives) is from about 0.5 to 2% or alternatively about 0.5 to 1%. Preferably, the w/w % amount is about 0.5%. The carbon black powder may have a size ranging from about 300 mesh to 850 mesh. In one embodiment, the carbon black may be mixed with the other four polyethylene resins. In one embodiment, the carbon black may be incorporated as part of a further polyethylene resin having a density of about 0.948 to 0.950 with HLMI of from about 5-8.

The antioxidants used in polyethylene are known in the art, and include hindered phenol, hindered amine and phosphite antioxidants.

Antioxidant is required in polyethylene to stabilize and protect the polymer from oxidative degradation. Primary antioxidants and thioesters are added to the polymer to provide end use product stability while phosphites or phosphonites are added to provide color and processing stability during pelletization extrusion or molding.

Finished end use parts must withstand increasing levels of temperature, necessitating increasing levels of antioxidants in the polymers to prevent long-term degradation and maintain the polymers physical properties.

Sterically hindered phenolic antioxidants have a positive effect on the long-term thermal stability (LTTS) of high density polyethylene.

The sterically hindered phenolic antioxidant Pentaerythritol Tetrakis(3-(3,5-di-tert-butyl-4-hydroxyphenyl)propionate is particularly effective for melt processing. This additive has a higher number of phenolic groups that serve as H-donors than other antioxidants such as Octadecyl-3-(3,5-di-tert.butyl-4-hydroxyphenyl)-propionate Butylhydroxytoluène.

The combination of a low volatile sterically hindered antioxidant such as Pentaerythritol Tetrakis(3-(3,5-di-tert-butyl-4-hydroxyphenyl)propionate in combination with an aromatic phosphite such as Tris(2,4-ditert-butylphenyl) phosphite is particularly synergistic and is more robust than an antioxidant alone. Cross-linking of HDPE is efficiently suppressed. As the phosphite is consumed during processing, a minimum loading of phosphite Tris(2,4-ditertbutylphenyl) phosphite is necessary to ensure a substantial amount in the product after multiple extrusions.

The phosphites protect the phenolic antioxidant during processing, thus leaving the phenolic structure practically intact which contributes to LTTS. However, phosphites do not specifically contribute to long terms thermal stability.

Trade Names of Preferred Antioxidant

Irganox 1010
Pentaerythritol Tetrakis(3-(3,5-di-tert-butyl-4-hydroxyphenyl)propionate
Tetraalkofen BPE
Pentaerythritol Tetrakis(3-(3,5-di-tert-butyl-4-hydroxyphenyl)propionate
Phenosane 23
Pentaerythritol Tetrakis(3-(3,5-di-tert-butyl-4-hydroxyphenyl)propionate
Dovernox 10
Pentaerythritol Tetrakis(3-(3,5-di-tert-butyl-4-hydroxyphenyl)propionate
Fenozan 22
Pentaerythritol Tetrakis(3-(3,5-di-tert-butyl-4-hydroxyphenyl)propionate
Fenozan23
Pentaerythritol Tetrakis(3-(3,5-di-tert-butyl-4-hydroxyphenyl)propionate
Nauguard 10
Pentaerythritol Tetrakis(3-(3,5-di-tert-butyl-4-hydroxyphenyl)propionate
Sumilizer BP 101
Pentaerythritol Tetrakis(3-(3,5-di-tert-butyl-4-hydroxyphenyl)propionate
Anox 20AM
Pentaerythritol Tetrakis(3-(3,5-di-tert-butyl-4-hydroxyphenyl)propionate
Ralox 630
Pentaerythritol tetrakis[3-(3',5'-di-tert-butyl-4'-hydroxyphenyl)propionate]
ADK Stab AO 60
3,5-bis(1,1-dimethylethyl)-4-hydroxy-,2,2-bis[[3-[3,5-bis(1,1-dimethylethyl)-4-hydroxyphenyl]-1-oxopropoxy]methyl]-1,3-propanediyl ester
Mark AO 60
3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester In one embodiment, the antioxidant is part (in admixture) with the first, second or both of the virgin polyethylene resin.

In one embodiment, the w/w % amount of antioxidant relative to the total weight of the composition/product (i.e. including all polyethylene resins and additives) is from about 0.5 to 2% or alternatively about 0.5 to 1%. Preferably, the w/w % amount is about 0.5%.

The polyethylene compositions described herein are especially suitable for the manufacturing of various polyethylene products.

The compositions described herein may be used to prepare extruded films or sheets. The polyethylene compositions film extrusion process may include blown film process, cast film process or extruded sheet process. The blown film, cast film and extruded sheet processes are known to the skilled person in the art.

The polyethylene compositions may also be used for molding, such as in an injection molding process. The injection molding process is known to the skilled person in the art.

The polyethylene compositions may also be used to prepare pellets which can be done by processing the polyethylene compositions in a rotating screw of an extruder, forcing the melted compositions through a die, cutting the extruded filaments into pellets.

The following examples are provided to further illustrate details for the preparation and use of the compounds of the present disclosure. They are not intended to be limitations on the scope of the instant disclosure in any way, and they should not be so construed. Furthermore, the compounds described in the following examples are not to be construed as forming the only genus that is considered as the disclosure, and any combination of the compounds or their moieties may itself form a genus.

EXAMPLES

In operation, the required amount of each component of the composition is measured gravimetrically and discharged into a holding silo. Once all of the components are presented the silo is discharged directly into a rotary drum ribbon blender. The rotary ribbon blades mix the material for a predetermined length of time. Once the composition is mixed, it is sent pneumatically to a crammer silo resident over the throat of an extruder. The composition is then crammed into the throat of a jacketed chill water cooled opening under pressure into an 8 inch 36:1 ratio extruder at temperatures between 225° C. and 290° C. The material flow is screened through a dutch weaved two ply metal screen pack at 88 mesh (150 μm). Once molten composition is through the screen it enters a die and is cut into pellets at a 0.125" (3175⊐1) diameter. These composition pellets can then be used to manufacture film, extruded sheets, injected parts or other common polyethylene applications.

As used herein, "ASTM" refers to American Society for Testing and Materials.

The Density is measured according to ASTM D4883 and is defined in $g/cm^3$.

The High Load Melt Index (HLMI) is measured according to ASTM D1238 using a load 21.6 Kg and is defined in g/10 min.

The Melt Flow Index (MFI) is measured according to ASTM D1238 using a load 2.16 Kg and is defined in g/10 min.

The Izod Impact Notched factor is assessed according to ASTM D256 and reported in $kJ/m^2$.

The Tensile Yield and Ultimate Break are measured according to ASTM D638 and are respectively defined in MPa and mm.

The Flexural modulus at 2% is measured according to ASTM D790 and is defined in MPa.

The Environmental Stress crack resistance is measured according to ASTM D1693-1 and is rated as a "pass" % rate.

The Ash content/Filler content ratio is assessed according to ASTM D5630.

The polyethylene content is assessed according to ASTM 3418.

Table 1 summarizes the observations for selected properties based on numerous samples obtained in accordance with the above process.

TABLE 1

| Property | Method | Value |
| --- | --- | --- |
| Density (gr/cm³) | ASTM D792 | 0.949-0.955 |
| Melt Index (gr/10 min) | ASTM D1238 (190° C./2.16 Kg) | 0.06-0.11 |
| High Load melt index (gr/10 min) | ASTM D1238 (190° C./21.6 Kg) | 9-11 |
| Notched Izod impact Izod (ft-lb/in) (kJ/ m²) | ASTM D256 | >8 No Break >43 |
| Flexural Modulus at 2% strain (Mpa) | ASTM D790 | 950-1110 |
| Tensile Yield (Mpa) | ASTM D638 | 25 |
| Environmental Stress-Cracking of ethylene plastics | ASTM D1693-1 | 100% Pass |
| Ash content/Filler content | ASTM D5630 | 0.376% |
| DSC (Melting Point) | | 0.70-0.90 |
| PE content | ASTM 3418 | 130-135° c. >99.5% PE |

As can be understood, the examples described above and illustrated are intended to be exemplary only. The scope is indicated by the appended claims.

All references cited herein are incorporated herein by reference.

The invention claimed is:

1. A process for preparing an polyethylene product, said process comprising the steps of:
   (a) providing:
   i) a first virgin polyethylene resin, having a bimodal molecular weight distribution which is high molecular weight (HMW), having a high load melt index measured according ASTM D-1238 (HLMI) of from about 1 to 6 g/10 min; and comprising a particle size distribution of less than about 50 µm;
   ii) a second virgin polyethylene resin, an HLMI of from about 20-70 g/10 min, a melt flow index measured according ASTM D-1238 (MFI) of from about 0.20-0.60 g/10 min, and comprising a particle size distribution of less than about 50 µm;
   iii) a first post-consumer polyethylene resin, having a MFI of from about 0.10-0.70 g/10 min;
   iv) a second post-consumer polyethylene resin, which is HMW, and having a HLMI of from about 4-8 g/10 min; and
   v) a polyethylene antioxidant;
   (b) blending i) to v) from step (a); and
   (c) melting and shaping the blend from step (b) to obtain said polyethylene product;
   wherein said product has at least one property selected from a density of about 0.94-0.96 g/cm³, a MFI of about 0.05-0.15 g/10 min, a HLMI of about 9-11 gr/10 min, a notched Izod impact factor of >8 ft-lb/in assessed according to ASTM D256, a Flexural Modulus at 2% strain of about 950-1200 Mpa assessed according to ASTM D790 and Tensile Yield of greater than about 25 Mpa assessed according to ASTM D638.

2. The process of claim 1 wherein said product is an extruded film or sheet selected from a blown film, a cast film or an extruded sheet.

3. The process of claim 1, wherein each of said first virgin polyethylene resin, said second virgin polyethylene resin, said first post-consumer polyethylene resin, and said second post-consumer polyethylene resin is a high density polyethylene; wherein said first virgin polyethylene resin, has a density of from about 0.948 to 0.955 g/cm³, said second virgin polyethylene resin, has a density of from about 0.950 to 0.960 g/cm³, said first post-consumer polyethylene resin has a_density of from about 0.955 to 0.970 g/cm³, said second post-consumer polyethylene resin has a density of from about 0.952 to 0.958 g/cm³.

4. The process of claim 1, wherein said first and second virgin polyethylene resin is each independently comprising a particle size distribution of less than about 30 µm.

5. The process of claim 1, wherein a weight ratio of the total of said first and second virgin polyethylene resin: the total of said first and second post-consumer polyethylene resin in the composition is from about 0.8-1.2:1.2-0.8.

6. The process of claim 1, wherein a weight ratio of the first virgin polyethylene resin to the second virgin polyethylene resin is from about 0.8-1.2.

7. The process of claim 1, wherein a weight ratio of the first post-consumer polyethylene resin to the second post-consumer polyethylene resin is from about 0.8-1.2:1.2-0.8.

8. The process of claim 1, wherein a weight ratio of the total of said first and second virgin polyethylene resin to the total of said first and second post-consumer polyethylene resin in the composition is from about 0.8-1.2:1.2-0.8, a weight ratio of the first virgin polyethylene resin to the second virgin polyethylene resin is from about 0.8-1.2 and a weight ratio of the first post-consumer polyethylene resin to the second post-consumer polyethylene resin is from about 0.8-1.2:1.2-0.8.

9. The process of claim 1, wherein said antioxidant is pentaerythritol tetrakis(3-(3,5-di-tert-butyl-4-hydroxyphenyl)propionate,
   3,5-bis(1,1-dimethylethyl)-4-hydroxy-,2,2-bis[[3-[3,5-bis(1,1-dimethylethyl)-4-hydroxyphenyl]-1-oxopropoxy]methyl]-1,3-propanediyl ester, or
   3-(3,5-di-tert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester.

10. The process of claim 9, wherein the w/w % amount of antioxidant relative to the total weight of the product is from about 0.5 to 2%.

11. The process of claim 8, wherein said antioxidant is pentaerythritol tetrakis(3-(3,5-di-tert-butyl-4-hydroxyphenyl)propionate,
   3,5-bis(1,1-dimethylethyl)-4-hydroxy-,2,2-bis[[3-[3,5-bis(1,1-dimethylethyl)-4-hydroxyphenyl]-1-oxopropoxy]methyl]-1,3-propanediyl ester, or
   3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester.

12. A polyethylene product comprising a composition comprising:
   i) a first virgin polyethylene resin, having a bimodal molecular weight distribution which is high molecular weight (HMW), having a high load melt index measured according ASTM D-1238 (HLMI) of from about 1 to 6 g/10 min; and comprising a particle size distribution of less than about 50 µm
   ii) a second virgin polyethylene resin, an HLMI from about 20-70 g/10 min, a melt flow index measured according ASTM D-1238 (MFI) of from about 0.20-0.60 g/10 min, and comprising a particle size distribution of less than about 50 µm;
   iii) a first post-consumer polyethylene resin, having a MFI of from about 0.10-0.70 g/10 min;
   iv) a second post-consumer polyethylene resin, which is HMW, and having a HLMI of from about 4-8 g/10 min; and
   v) a polyethylene antioxidant;
   wherein said product has at least one property selected from a density of about 0.94-0.96 g/cm³, a MFI of about 0.05-0.15 g/10 min, a HLMI of about 9-11 gr/10 min, a notched Izod impact factor of >8 ft-lb/in assessed according to ASTM D256, a Flexural Modulus at 2% strain of about 950-1200 Mpa assessed according to ASTM D790 and Tensile Yield of greater than about 25 Mpa assessed according to ASTM D638.

13. The product of claim 12, wherein each of said first virgin polyethylene resin, said second virgin polyethylene resin, said first post-consumer polyethylene resin, and said second post-consumer polyethylene resin is a high density polyethylene; wherein said first virgin polyethylene resin, has a density of from about 0.948 to 0.955 g/cm$^3$, said second virgin polyethylene resin, has a density of from about 0.950 to 0.960 g/cm$^3$, said first post-consumer polyethylene resin has a density of from about 0.955 to 0.970 g/cm$^3$, said second post-consumer polyethylene resin has a density of from about 0.952 to 0.958 g/cm$^3$.

14. The product of claim 12, wherein the w/w % amount of antioxidant relative to the total weight of the product is from about 0.5 to 2%.

15. The product of claim 14, wherein said antioxidant is pentaerythritol tetrakis(3-(3,5-di-tert-butyl-4-hydroxyphenyl)propionate,
    3,5-bis(1,1-dimethylethyl)-4-hydroxy-,2,2-bis[[3-[3,5-bis(1,1-dimethylethyl)-4-hydroxyphenyl]-1-oxopropoxy]methyl]-1,3-propanediylester, or
    3-(3,5-ditert-butyl-4-hydroxyphenyl)propanoic acid [3-[3-(3,5-ditert-butyl-4-hydroxyphenyl)-1-oxopropoxy]-2,2-bis[[3-(3,5-ditert-butyl-4-hydroxyphenyl)-1-oxopropoxy]methyl]propyl] ester.

16. A composition comprising:
i) a first virgin polyethylene resin, having a bimodal molecular weight distribution which is high molecular weight (HMW), having a high load melt index measured according ASTM D-1238 (HLMI) of from about 1 to 6 g/10 min; and comprising a particle size distribution of less than about 50 μm
ii) a second virgin polyethylene resin, an HLMI from about 20-70 g/10 min, a melt flow index measured according ASTM D-1238 (MFI) of from about 0.20-0.60 g/10 min, and comprising a particle size distribution of less than about 50 μm;
iii) a first post-consumer polyethylene resin, having a MFI of from about 0.10-0.70 g/10 min;
iv) a second post-consumer polyethylene resin, which is HMW, and having a HLMI of from about 4-8 g/10 min; and
v) a polyethylene antioxidant,
wherein the antioxidant is pentaerythritol tetrakis(3-(3,5-di-tert-butyl-4-hydroxyphenyl)propionate, 3,5-bis(1,1-dimethylethyl-4-hydroxy-,2,2-bis[[3-[3,5-bis(1,1-dimethylethyl-4-hydroxyphenyl]-1-oxopropoxy]methyl]-1,3-propanediyl ester, or 3-(3,5-di-tert-butyl-4-hydroxyphenyl)propanoic acid [3-[3-(3,5-ditert-butyl-4-hydroxphenyl)-1-oxopropoxyl-2,2-bis[[3-(3,5-ditert-butyl-4-hydroxyphenyl)-1-oxopropoxy]methyl]propyl] ester.

* * * * *